United States Patent [19]

Hansen et al.

[11] Patent Number: 5,066,791
[45] Date of Patent: Nov. 19, 1991

[54] PYRIDONEAZO DYES WITH AN M-AMINOBENZOIC ESTER AS THE DIAZO COMPONENT

[75] Inventors: Guenter Hansen, Ludwigshafen; Gunther Lamm, Hassloch; Hermann Loeffler, Speyer, all of Fed. Rep. of Germany

[73] Assignee: BASF Aktiengesellschaft, Ludwigshafen, Fed. Rep. of Germany

[21] Appl. No.: 480,359

[22] Filed: Feb. 14, 1990

Related U.S. Application Data

[63] Continuation of Ser. No. 263,884, Oct. 28, 1988, abandoned.

[30] Foreign Application Priority Data

Oct. 30, 1987 [DE] Fed. Rep. of Germany ....... 3736817

[51] Int. Cl.$^5$ .................. C09B 29/42; D06D 3/52
[52] U.S. Cl. .................. 534/772; 534/573; 534/582
[58] Field of Search .................. 534/772

[56] References Cited

U.S. PATENT DOCUMENTS

| 3,487,066 | 12/1969 | Ritter et al. ............... | 534/772 |
| 3,923,776 | 12/1975 | Gnad ........................ | 534/772 |
| 4,305,718 | 12/1981 | Loeffler et al. ............ | 534/772 X |
| 4,380,452 | 9/1983 | Loeffler et al. ............ | 534/722 X |

FOREIGN PATENT DOCUMENTS

| 2147759 | 3/1973 | Fed. Rep. of Germany ...... | 534/772 |
| 2265824 | 10/1975 | France ....................... | 534/772 |
| 54-38332 | 3/1979 | Japan ......................... | 534/772 |
| 58-136656 | 8/1983 | Japan ......................... | 534/772 |

OTHER PUBLICATIONS

Mitsubishi I, Chemical Abstracts, vol. 100, No. 105092t (1984).
Mitsubishi II, Chemical Abstracts, vol. 100, No. 87239q (1984).
Mitsubishi III, Chemical Abstracts, vol. 101, No. 153476p (1984).
Mitsubishi IV, Chemical Abstracts, vol. 101, No. 173004m (1984).
Mitsubishi V, Derwent Abstract of JP-A-136656/1983.

Primary Examiner—Mary C. Lee
Assistant Examiner—Fiona T. Powers
Attorney, Agent, or Firm—Oblon, Spivak, McClelland, Maier & Neustadt

[57] ABSTRACT

Pyridoneazo dyes of the formula

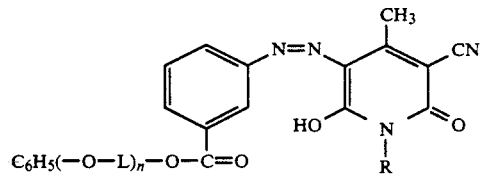

where L is $C_2$- or $C_3$-alkylene, R is $C_1$-$C_3$-alkyl and n is 1, 2 or 3, are useful for dyeing polyester fabrics.

2 Claims, No Drawings

PYRIDONEAZO DYES WITH AN M-AMINOBENZOIC ESTER AS THE DIAZO COMPONENT

This application is a continuation of application Ser. No. 263,884, filed on Oct. 28, 1988, now abandoned.

The present invention relates to novel pyridoneazo dyes which have a diazo component based on a 3-amino-benzoic ester and a coupling component based on a 1-($C_1$-$C_3$ alkyl)-2-hydroxypyrid-6-one and to the use thereof for dyeing polyester fabrics.

JP-A-136656/1983 has already disclosed azo dyes which have diazo components based on specific 2-, 3- or 4-aminobenzoic esters and coupling components based on 1-alkyl-2-hydroxy-4-methyl-5-cyanopyrid-6-ones. But it has been found that the dyes described therein still have defects as regards their application properties.

It is an object of the present invention to provide new pyridoneazo dyes which have an advantageous range of application properties.

We have found that this object is achieved with novel pyridoneazo dyes of the formula I

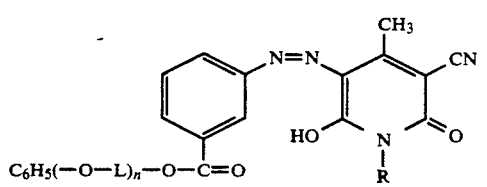

where L is $C_2$- or $C_3$-alkylene, R is $C_1$-$C_3$-alkyl and n is 1, 2 or 3.

Radicals L are for example ethylene or 1,2- or 1,3-propylene. Radicals R are for example methyl, ethyl or propyl.

Examples of radicals for the $C_6H_5(-O-L)_n$ group are $C_6H_5O-CH_2CH_2-$, $C_6H_5O-CH_2CH(CH_3)-$, $C_6H_5O-CH(CH_3)CH_2-$, $C_6H_5O-CH_2CH_2O-CH_2CH_2-$, $C_6H_5O-CH_2CH_2CH_2O-CH_2CH_2-$, $C_6H_5O-CH_2CH_2O-CH_2CH_2CH_2-$ or $C_6H_5O-CH_2CH_2O-CH_2CH_2O-CH_2CH_2-$.

Preference is given to pyridoneazo dyes of the formula I where L is ethylene, R is methyl, ethyl or n-propyl and n is 1.

Particular preference is given to pyridoneazo dyes of the formula I where L is ethylene, R is methyl or ethyl, in particular ethyl and n is 1.

It is also possible to use the novel pyridoneazo dyes of formula I mixed with one another, in which case preference is given to those mixtures which contain from 85 to 99% by weight of pyridoneazo dyes of formula I where n is 1 and from 1 to 15% by weight of pyridoneazo dyes of the formula I where n is 2 and/or 3. These percentages are each based on the total weight of pyridoneazo dyes of the formula I present in the mixture.

The pyridoneazo dyes according to the invention can be prepared in a conventional manner. For instance, the conventionally prepared diazonium salt of an amine of the formula II

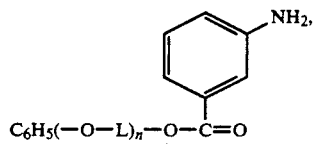

where L and n are each as defined above, can be coupled with a 2-hydroxypyrid-6-one of the formula III

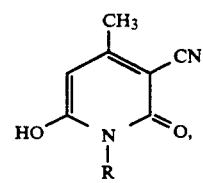

where R is as defined above.

The novel pyridoneazo dyes of the formula I are advantageously suitable for dyeing polyester fabrics, in brilliant yellow to green shades. The dyes according to the invention show high light fastness and good build-up. Moreover, they even dye polyester fabrics at a relatively low dyeing temperature.

The following Examples illustrate the invention:

EXAMPLE 1

257 g of phenyl glycol 3-aminobenzoate were dissolved at from 50° to 60° C. in 2,000 ml of water, 8 g of an acid pH wetting agent based on an addition product of ethylene oxide on oleylamine and 100 ml of concentrated hydrochloric acid. Thereafter the solution was cooled down to room temperature, and 200 ml of concentrated hydrochloric acid and 100 g of glacial acetic acid were added simultaneously. The reaction mixture was then cooled down to 0° C. by adding ice and subsequently mixed by very thorough stirring with 310 ml of 23% strength by weight aqueous sodium nitrite solution. The reaction mixture was stirred at from 0° to 5° C. for 3 hours and filtered. In the filtrate, excess nitrous acid was destroyed by adding amidosulfuric acid. 192 g of 1-n-propyl-2-hydroxy-3-cyano-4-methylpyrid-6-one, dissolved in 2000 ml of water and 200 g of 50% strength by weight sodium hydroxide solution, were then added to the filtrate with very thorough stirring. The pH of the reaction mixture was then raised to 8.0-8.5 with sodium hydroxide solution. This was followed by stirring for from 1 to 2 hours, and the suspension was then heated at from 80° to 95° C. until the dye was present in the desired crystalline form. The target product was filtered off with suction and washed with water until salt-free. Drying left 451 g of a yellow powder which gives a yellow solution in acetone, and dyes polyethylene terephthalate fabric in deep greenish yellow shades. The melting point of the dye is 150° C. Its formula is

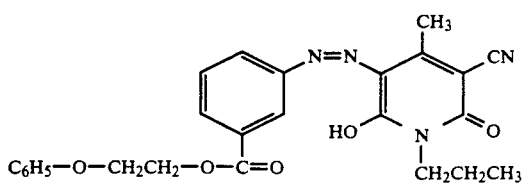

The same method was used to obtain the dyes of formula

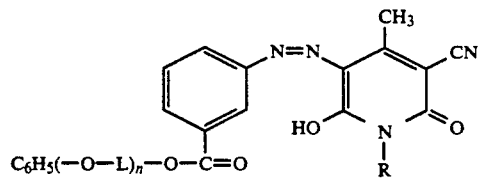

listed in the following table:

| Ex. No. | $C_6H_5(-O-L)_n$ | R |
|---|---|---|
| 2 | $C_6H_5OCH_2CH_2$ | $CH_3$ |
| 3 | $C_6H_5OCH_2CH_2$ | $C_2H_5$ |
| 4 | $C_6H_5(OCH_2CH_2)_2$ | $CH_3$ |
| 5 | $C_6H_5(OCH_2CH_2)_2$ | $C_2H_5$ |
| 6 | $C_6H_5(OCH_2CH_2)_2$ | $n\text{-}C_3H_7$ |
| 7 | $C_6H_5(OCH_2CH_2)_3$ | $CH_3$ |
| 8 | $C_6H_5(OCH_2CH_2)_3$ | $C_2H_5$ |
| 9 | $C_6H_5(OCH_2CH_2)_3$ | $n\text{-}C_3H_7$ |
| 10 | $C_6H_5OCH(CH_3)CH_2$ | $CH_3$ |
| 11 | $C_6H_5OCH(CH_3)CH_2$ | $C_2H_5$ |
| 12 | $C_6H_5OCH(CH_3)CH_2$ | $n\text{-}C_3H_7$ |
| 13 | $C_6H_5OCH_2CH(CH_3)$ | $CH_3$ |
| 14 | $C_6H_5OCH_2CH(CH_3)$ | $C_2H_5$ |
| 15 | $C_6H_5OCH_2CH(CH_3)$ | $n\text{-}C_3H_7$ |

We claim:

1. A pyridoneazo dye of the formula I $$\text{(structure I with HC group)}$$

where L is ethylene, R is methyl or ethyl and n is 1.

2. A pyridoneazo dye of the formula I $$\text{(structure I with HO group)}$$

where L is ethylene, R is methyl and n is 1.

* * * * *